(12) United States Patent
Jiang et al.

(10) Patent No.: US 11,689,340 B2
(45) Date of Patent: *Jun. 27, 2023

(54) TRANSMISSION METHOD, RELATED EQUIPMENT AND SYSTEM FOR TERMINAL SELF-INTERFERENCE

(71) Applicant: VIVO MOBILE COMMUNICATION CO., LTD., Chang'an Dongguan (CN)

(72) Inventors: Dajie Jiang, Chang'an Dongguan (CN); Fei Qin, Chang'an Dongguan (CN); Xiaodong Shen, Chang'an Dongguan (CN); Boubacar Kimba Dit Adamou, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,672

(22) Filed: Nov. 30, 2021

(65) Prior Publication Data

US 2022/0094506 A1 Mar. 24, 2022

Related U.S. Application Data

(63) Continuation of application No. 16/618,671, filed as application No. PCT/CN2018/085660 on May 4, 2018, now Pat. No. 11,223,464.

(30) Foreign Application Priority Data

Jun. 2, 2017 (CN) .......................... 201710409941.4

(51) Int. Cl.
*H04L 5/00* (2006.01)
*H04L 1/18* (2023.01)
(Continued)

(52) U.S. Cl.
CPC .......... *H04L 5/0073* (2013.01); *H04L 1/1812* (2013.01); *H04L 5/0048* (2013.01);
(Continued)

(58) Field of Classification Search
CPC ... H04W 28/04; H04W 72/04; H04W 72/042; H04W 88/08; H04W 72/0413;
(Continued)

(56) References Cited

U.S. PATENT DOCUMENTS

| | | | |
|---|---|---|---|
| 2011/0176501 A1 | 7/2011 | Jeong et al. | |
| 2012/0064904 A1* | 3/2012 | Lee ..................... | H04W 72/082 455/450 |

(Continued)

FOREIGN PATENT DOCUMENTS

| | | |
|---|---|---|
| CN | 102045779 A | 5/2011 |
| CN | 102547734 A | 7/2012 |

(Continued)

OTHER PUBLICATIONS

International Search Report and Written Opinion related to Application No. PCT/CN2018/085660 dated Dec. 12, 2019.
(Continued)

*Primary Examiner* — Peter G Solinsky
*Assistant Examiner* — Sanjay K Dewan
(74) *Attorney, Agent, or Firm* — von Briesen & Roper, s.c.

(57) ABSTRACT

Embodiments of the present disclosure provide a transmission method, related equipment and system for terminal self-interference. The method includes: obtaining transmission time domain information of a user terminal experiencing terminal self-interference, the transmission time domain information being transmission time domain information of the user terminal after the terminal self-interference has occurred for the user terminal; and carrying out transmission
(Continued)

with the user terminal according to the transmission time domain information.

20 Claims, 8 Drawing Sheets

(51) Int. Cl.
| | | |
|---|---|---|
| *H04W 72/04* | (2023.01) | |
| *H04L 1/1812* | (2023.01) | |
| *H04W 72/0446* | (2023.01) | |
| *H04W 72/0453* | (2023.01) | |
| *H04W 72/21* | (2023.01) | |
| *H04W 72/23* | (2023.01) | |

(52) U.S. Cl.
CPC ....... *H04L 5/0053* (2013.01); *H04W 72/0446* (2013.01); *H04W 72/0453* (2013.01); *H04W 72/21* (2023.01); *H04W 72/23* (2023.01)

(58) Field of Classification Search
CPC .......... H04W 72/0446; H04W 72/0453; H04L 5/0007; H04L 5/0073; H04L 5/0048; H04L 5/0053; H04L 1/1812
USPC .......................................................... 370/329
See application file for complete search history.

(56) References Cited

U.S. PATENT DOCUMENTS

| | | | |
|---|---|---|---|
| 2015/0103706 A1 | 4/2015 | Li et al. | |
| 2015/0257130 A1 | 9/2015 | Lee et al. | |
| 2015/0327280 A1* | 11/2015 | Zhang | ................... H04W 76/20 370/336 |
| 2016/0006529 A1 | 1/2016 | Yi et al. | |
| 2016/0007347 A1 | 1/2016 | Nagata et al. | |
| 2016/0014781 A1 | 1/2016 | Nagata et al. | |
| 2016/0127114 A1* | 5/2016 | Kim | ................... H04W 72/0453 370/252 |
| 2016/0227524 A1* | 8/2016 | Choi | ......................... H04L 5/00 |
| 2018/0160432 A1 | 6/2018 | Kim et al. | |
| 2018/0205533 A1 | 7/2018 | Lee et al. | |

FOREIGN PATENT DOCUMENTS

| | | | | | |
|---|---|---|---|---|---|
| CN | 102802243 | A | | 11/2012 | |
| CN | 102932117 | A | * | 2/2013 | ........ H04W 72/1215 |
| CN | 103037481 | A | | 4/2013 | |
| CN | 103650557 | A | | 3/2014 | |
| CN | 104982057 | A | | 10/2015 | |
| CN | 105027602 | A | | 11/2015 | |
| CN | 105075159 | A | | 11/2015 | |
| CN | 106412977 | A | | 2/2017 | |
| EP | 3 136 671 | A1 | * | 3/2017 | ............... H04L 1/18 |
| EP | 3136671 | A1 | | 3/2017 | |
| WO | 2015020607 | A1 | | 2/2015 | |
| WO | 2016195202 | A1 | | 12/2016 | |
| WO | 2017007172 | A1 | | 1/2017 | |

OTHER PUBLICATIONS

First Chinese Office Action related to Application No. 201710409941.4 dated Nov. 26, 2019.
Second Chinese Office Action related to Application No. 201710409941.4 dated Feb. 25, 2020.
Extended European Search Report related to Application No. 18810569.6 dated Mar. 3, 2020.
Extended European Search Report related to Application No. 21208452.9 dated Dec. 23, 2021.

* cited by examiner

TRANSMISSION METHOD, RELATED EQUIPMENT AND SYSTEM FOR TERMINAL SELF-INTERFERENCE

CROSS-REFERENCE TO RELATED APPLICATION

This application is a continuation of U.S. patent application Ser. No. 16/618,671 which is the U.S. national phase of PCT Application No. PCT/CN2018/085660 filed on May 4, 2018, which claims a priority to Chinese Patent Application No. 201710409941.4 filed on Jun. 2, 2017, the disclosures of which are incorporated in their entireties by reference herein.

TECHNICAL FIELD

The present disclosure relates to the field of communication technologies, and in particular to a transmission method, related equipment, and system for terminal self-interference.

BACKGROUND

Interference problems have always existed in the communication technologies, and interference seriously affects communication performance of user terminals. Common interferences include interference between different terminals, and interference between different systems, etc. However, with development of the communication technologies and users' higher performance requirements for the user terminals, another type of interference is found, and this interference is terminal self-interference. The terminal self-interference refers to interference generated by signals transmitted by the user terminal itself due to non-ideality of radio frequency devices, such as received signals of the user terminal itself being affected by high-order signal components. For example, an uplink signal transmitted by the user terminal causes interference to a downlink signal of the user terminal. How to carry out effective transmission when there is terminal self-interference is a technical problem that needs to be solved urgently.

SUMMARY

Embodiments of the present disclosure provide a transmission method, related equipment and a system for terminal self-interference, to solve the problem of how to perform transmission when there is terminal self-interference.

In a first aspect, one embodiment of the present disclosure provides a transmission method for terminal self-interference, which is applied to a first network device, including:

obtaining transmission time domain information of a user terminal experiencing terminal self-interference, the transmission time domain information being transmission time domain information of the user terminal after the terminal self-interference occurs at the user terminal; and carrying out transmission with the user terminal according to the transmission time domain information.

In a second aspect, one embodiment of the present disclosure provides a transmission method for terminal self-interference, which is applied to a second network device, including:

when a user terminal experiences terminal self-interference, obtaining transmission time domain information of the user terminal, the transmission time domain information being transmission time domain information of the user terminal after the terminal self-interference occurs at the user terminal; and sending the transmission time domain information to a first network device, thereby enabling the first network device to perform transmission with the user terminal according to the transmission time domain information.

In a third aspect, one embodiment of the present disclosure provides a transmission method for terminal self-interference, which is applied to a centralized control unit, including:

when a user terminal experiences terminal self-interference, configuring transmission time domain information of the user terminal for a first network device and a second network device, respectively, the transmission time domain information being transmission time domain information of the user terminal after the terminal self-interference occurs at the user terminal;

sending respective transmission time domain information to the first network device and the second network device, respectively, thereby enabling the first network device and the second network device to perform transmission with the user terminal according to their own transmission time domain information.

In a fourth aspect, one embodiment of the present disclosure provides a network device, which is a first network device, including:

an obtaining module configured to obtain transmission time domain information of a user terminal experiencing terminal self-interference, the transmission time domain information being transmission time domain information of the user terminal after the terminal self-interference occurs at the user terminal; and, a transmission module configured to carry out transmission with the user terminal according to the transmission time domain information.

In a fifth aspect, one embodiment of the present disclosure provides a network device, which is a second network device, including:

an obtaining module configured to, when a user terminal experiences terminal self-interference, obtain transmission time domain information of the user terminal, the transmission time domain information being transmission time domain information of the user terminal after the terminal self-interference occurs at the user terminal; and, a transmission module configured to, send the transmission time domain information to a first network device, thereby enabling the first network device to perform transmission with the user terminal according to the transmission time domain information.

In a sixth aspect, one embodiment of the present disclosure provides a centralized control unit, including:

a configuration module configured to, when a user terminal experiences terminal self-interference, configure transmission time domain information of the user terminal for a first network device and a second network device, respectively, the transmission time domain information being transmission time domain information of the user terminal after the terminal self-interference occurs at the user terminal;

a transmission module configured to send respective transmission time domain information to the first network device and the second network device, respectively, thereby enabling the first network device and the second network device to perform transmission with the user terminal according to their own transmission time domain information.

In a seventh aspect, one embodiment of the present disclosure provides a network device including: a processor, a memory, a transceiver and a user interface; wherein the processor, the memory, the transceiver and the user interface are coupled together by a bus system, the processor is configured to read a program in the memory to implement steps of the method corresponding to the first network device according to one embodiment of the present disclosure.

In an eighth aspect, one embodiment of the present disclosure provides a network device including: a processor, a memory, a transceiver and a user interface; wherein the processor, the memory, the transceiver and the user interface are coupled together by a bus system, the processor is configured to read a program in the memory to implement steps of the method corresponding to the second network device according to one embodiment of the present disclosure.

In a ninth aspect, one embodiment of the present disclosure provides a centralized control unit including: a processor, a memory, a transceiver and a user interface; wherein the processor, the memory, the transceiver and the user interface are coupled together by a bus system, the processor is configured to read a program in the memory to implement steps of the method corresponding to the centralized control unit according to one embodiment of the present disclosure.

In a tenth aspect, one embodiment of the present disclosure provides a transmission system for terminal self-interference, including: the first network device and the second network device according to one embodiment of the present disclosure; or, including: the first network device and the centralized control unit according to one embodiment of the present disclosure In an eleventh aspect, one embodiment of the present disclosure provides a computer readable storage medium, wherein the computer readable storage medium stores a resource configuration program, the resource configuration program being executed by a processor to implement steps of the method corresponding to the first network device according to one embodiment of the present disclosure.

In a twelfth eleventh aspect, one embodiment of the present disclosure provides a computer readable storage medium, wherein the computer readable storage medium stores a resource configuration program, the resource configuration program being executed by a processor to implement steps of the method corresponding to the second network device according to one embodiment of the present disclosure.

In a thirteenth aspect, one embodiment of the present disclosure provides a computer readable storage medium, wherein the computer readable storage medium stores a resource configuration program, the resource configuration program being executed by a processor to implement steps of the method corresponding to the centralized control unit according to one embodiment of the present disclosure.

In this way, in the embodiment of the present disclosure, the transmission time domain information of the user terminal experiencing terminal self-interference is obtained, and then, when there is terminal self-interference, transmission with the user terminal can be carried out according to the transmission time domain information, thereby avoiding terminal self-interference and then improving communication efficiency.

BRIEF DESCRIPTION OF THE DRAWINGS

In order to illustrate technical solutions according to embodiments of the present disclosure more clearly, drawings to be used in the description of the embodiments of the present disclosure will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions of embodiments of the present disclosure will be described hereinafter in a clear and complete manner in conjunction with the drawings of the embodiments of the present disclosure. Apparently, the following embodiments are merely a part of, rather than all of, the embodiments of the present disclosure, and based on these embodiments, a person skilled in the art may obtain the other embodiments, which also fall within the scope of the present disclosure.

The term "include" and its variations in the specification and claims of the application are intended to cover a non-exclusive inclusion, for example, a process, method, system, product or device including a series of steps or units is not necessarily limited to those steps or units explicitly listed, but may include other steps or units not explicitly listed or inherent to such process, method, product or device. Moreover, the use of "and/or" in the specification and claims of the application describes an association relationship of associated objects, which denotes that three relationships may exist, e.g., A and/or B may demonstrate that: A exists independently, B exists independently, A and B exist simultaneously.

In the embodiments of the present invention, the words "exemplary" or "example" are used herein to mean serving as an example, instance, or illustration. Any aspect or design described herein as "example" and/or "exemplary" is not necessarily to be construed as preferred or advantageous over other aspects or designs. Rather, the use of the words "exemplary" or "example" are intended to present concepts in a concrete fashion.

Figure 1:
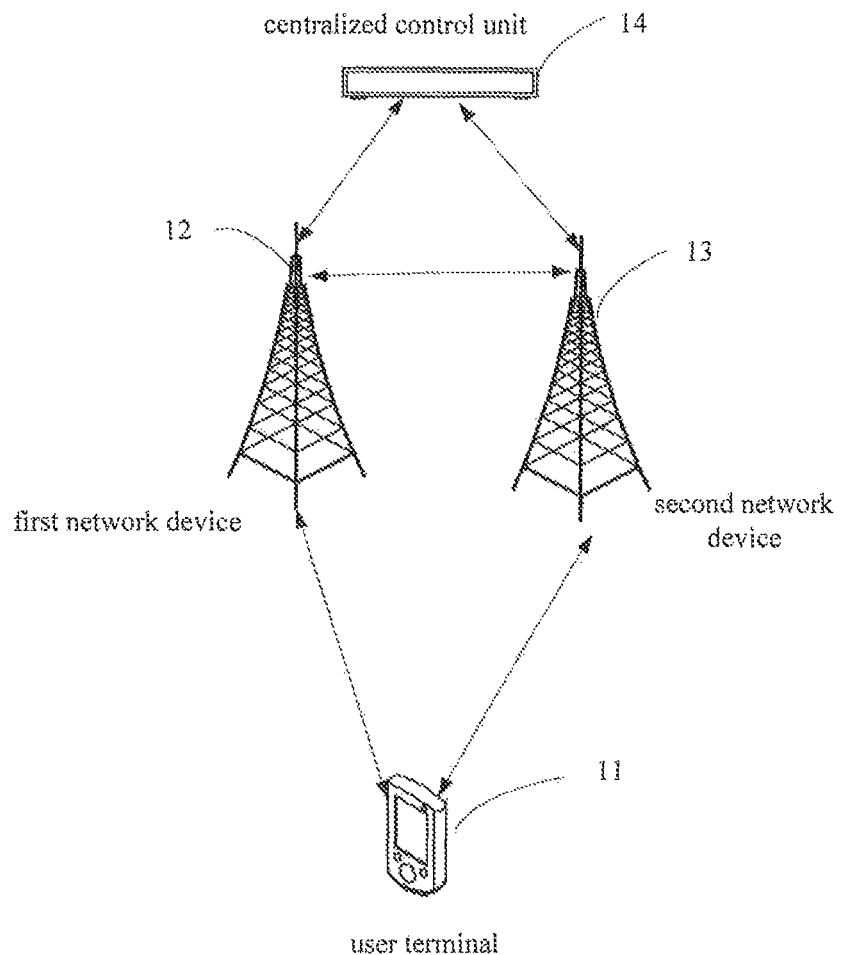
FIG. 1 is a structural diagram of an applicable network system according to an embodiment of the present disclosure.

Referring to FIG. 1, FIG. 1 is a structural diagram of an applicable network system according to an embodiment of the present disclosure. As shown in FIG. 1, the network system includes a user terminal 11, a first network device 12, a second network device 13 and a centralized control unit 14. The user terminal 11 may be a user equipment (UE), for example, a mobile phone, a tablet personal computer, a laptop computer, a personal digital assistant (PDA), and a mobile internet access device (MID) or a wearable device. It should be noted that the specific type of the user terminal 11 is not limited in the embodiment of the present disclosure. The user terminal 11 can establish communication with the first network device 12 and the second network device 13 simultaneously. The first network device 12 may be a network device in a first system, for example, a base station in the first system, and the base station may be a macro station, such as LTE eNB and 5G NR gNB. The first network device 12 may also be an access point (AP). The second network device 13 may be a network device in a second system, for example, a base station in the second system, and the base station may be a macro station such as LTE eNB and 5G NR gNB. It should be noted that, in the embodiment of the present disclosure, the specific types of the first network device 12 and the second network device 13 are not limited. In addition, the first system may be an LTE system, and the second system may be a 5G New Radio (NR) system; or, the first system may be a 5G NR system, and the second system may be an LTE system. In one embodiment of the present disclosure, the first system and the second system may be tightly coupled in a dual connectivity (DC) manner. One of the systems acts as a master node (MN) and the other system acts as a secondary node (SN). The dual connectivity system includes two cell groups, which are a master cell group (MCG) and a secondary cell group (SCG). The master cell group may include one primary cell (PCell) and one or more secondary cells (SCells). The secondary cell group may include one primary-secondary cell (PSCell), and one or more SCells. The centralized control unit 14 may be deployed in the first network device, the second network device, or other network nodes, which is not limited in this embodiment.

In the above network system, the user terminal 11 may perform data transmission with the first network device 12 and the second network device 13 simultaneously, or may also perform data transmission with the first network device 12 and the second network device 13 at different times, which is not limited in this embodiment.

Figure 2:
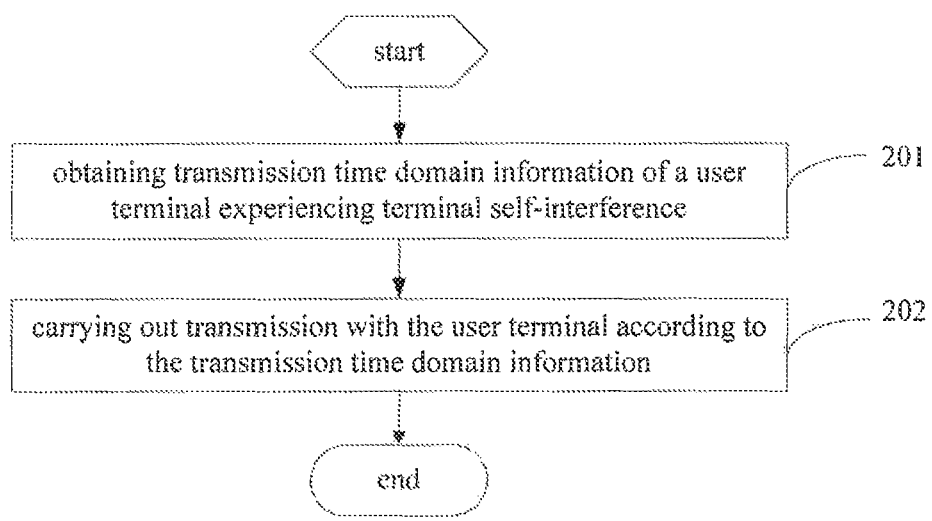
FIG. 2 is a flowchart of a transmission method for terminal self-interference according to an embodiment of the present disclosure.

Referring to FIG. 2, FIG. 2 is a flowchart of a transmission method for terminal self-interference according to an embodiment of the present disclosure. The method is applied to a first network device. As shown in FIG. 2, the method includes the following steps.

Step 201: obtaining transmission time domain information of a user terminal experiencing terminal self-interference, the transmission time domain information being transmission time domain information of the user terminal after the terminal self-interference occurs at the user terminal.

The above terminal self-interference may be that interference generated by signals transmitted by the user terminal itself affects received signals of the user terminal itself. For example, an uplink signal sent by the user terminal affects a downlink signal received by the user terminal.

The above obtaining the transmission time domain information may include receiving the transmission time domain information sent by the second network device, or receiving the transmission time domain information sent by the centralized control unit 14. The second network device may be a network device that establishes a connection with the user terminal. That is, the user terminal establishes a connection with the first network device and the second network device simultaneously.

In addition, the above transmission time domain information being transmission time domain information of the user terminal after the terminal self-interference occurs at the user terminal, may be that the transmission time domain information is used to determine time domain information for transmission between the first network device and the user terminal, after the terminal self-interference occurs at the user terminal. Further, the above transmission time domain information may be transmission time domain information for eliminating terminal self-interference or reducing terminal self-interference, that is, when the first network device performs transmission according to the transmission time domain information, the terminal self-interference may be eliminated or effects of the terminal self-interference may be reduced.

Step 202: carrying out transmission with the user terminal according to the transmission time domain information.

After the transmission time domain information is obtained, transmission with the user terminal may be performed according to the transmission time domain information. For example, the above transmission time domain information may be used to determine an available time domain for transmission between the first network device and the user terminal. That is, according to the above transmission time domain information, the first network device may determine an available time domain resource for transmission with the user terminal. The first network device may perform transmission with the user terminal on the available time domain resource. The above available time domain resource may be such a time domain resource that when the first network device performs transmission with the user terminal on the available time domain resource, the terminal self-interference of the user terminal may be eliminated, or the effects of the terminal self-interference of the user terminal may be reduced. In addition, the above transmission includes an uplink transmission and/or a downlink transmission.

In this embodiment, through the above steps, when the terminal self-interference occurs, transmission with the user terminal may be carried out according to the transmission time domain information. Meanwhile, the terminal self-interference may be eliminated or the effects of the terminal self-interference may be reduced.

Figure 3:
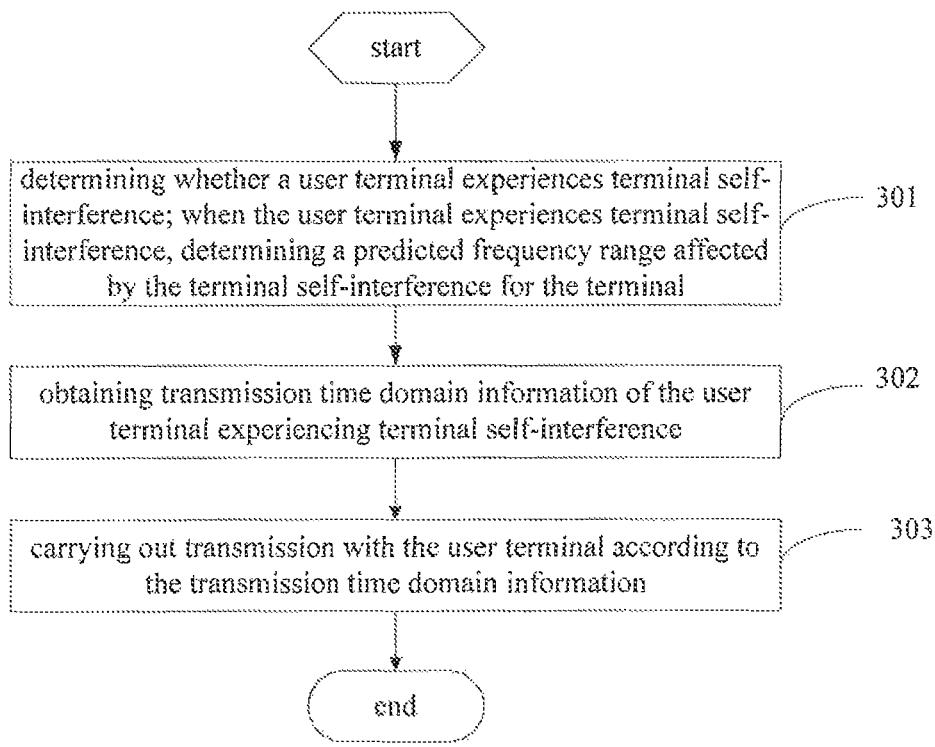
FIG. 3 is a flowchart of another transmission method for terminal self-interference according to an embodiment of the present disclosure.

Referring to FIG. 3, FIG. 3 is a flowchart of another transmission method for terminal self-interference according to an embodiment of the present disclosure. The method is applied to a first network device. As shown in FIG. 3, the method includes the following steps.

Step 301: determining whether a user terminal experiences terminal self-interference; when the user terminal experiences terminal self-interference, determining a predicted frequency range affected by the terminal self-interference for the terminal.

The determining whether the user terminal experiences terminal self-interference may be determined according to information reported by the user terminal, or may be determined according to an operating frequency of the user terminal.

In addition, the above predicted frequency range may be understood as a frequency range that may be affected by the terminal self-interference, that is, the predicted frequency range may be predicted. For example, prediction is performed before the user terminal performs signal transmission, thereby obtaining the frequency range that may be affected by the terminal self-interference, i.e., determining which frequency range is potentially interfered with. Preferably, the above predicted frequency range may a frequency range in which the user terminal is potentially interfered with. Of course, the above predicted frequency range may also be a frequency range affected by the terminal self-interference recorded before performing the step 301.

Optionally, determining whether the user terminal experiences terminal self-interference includes:

determining whether a terminal self-interference isolation reported by the user terminal is smaller than a preset first threshold; when the terminal self-interference isolation is smaller than the preset first threshold, determining that the user terminal experiences terminal self-interference; or, determining whether a downlink packet loss rate reported by the user terminal is greater than a preset second threshold; when the downlink packet loss rate is greater than the preset second threshold, determining that the user terminal experiences terminal self-interference; or, determining whether a downlink interference level reported by the user terminal is greater than a preset third threshold; when the downlink interference level is greater than the preset third threshold, determining that the user terminal experiences terminal self-interference; or, determining whether a received-signal sensitivity reported by the user terminal is greater than a preset fourth threshold; when the received-signal sensitivity is greater than the preset fourth threshold, determining that the user terminal experiences terminal self-interference; or, determining whether a degradation value of the received-signal sensitivity reported by the user terminal is greater than a preset fifth threshold; when the degradation value of the received-signal sensitivity is greater than the preset fifth threshold, determining that the user terminal experiences terminal self-interference.

The above terminal self-interference isolation may be a difference obtained by subtracting a power (i.e., size of a generated interference) of an interference source signal received by an interfered link from a transmission power of an interference source link. For example, a transmission power of a signal sent by the user terminal at a frequency point A is 20 dBm, and a power (interference size) of the signal received at a frequency B is −40 dBm, then an isolation index is 60 dB.

The above downlink packet loss rate may be a downlink packet loss rate when the user terminal simultaneously transmits an uplink signal and a downlink signal. For example, the above downlink packet loss rate may be a downlink packet loss rate of the second system, when the user terminal simultaneously transmits an uplink signal in the first system and a downlink signal in the second system. The downlink interference level may be a downlink interference level when the user terminal simultaneously transmits the uplink signal and the downlink signal. For example, the downlink interference level may be a downlink interference level of the first system, when the user terminal simultaneously transmits an uplink signal in the first system and an uplink signal in the second system and when the user terminal transmits a downlink signal in the first system.

The above received-signal sensitivity may indicate a received-signal sensitivity of the user terminal which has been affected by the terminal self-interference. The above degradation value of the received-signal sensitivity may be a degradation value of the received-signal sensitivity of the user terminal which has been affected by the terminal self-interference. For example, under normal conditions unaffected by the terminal self-interference, a received-signal sensitivity of the user terminal is −85 dBm. When there is terminal self-interference, a larger receiving signal level is required to receive successfully, such as −80 dBm. Then, the degradation value of the received-signal sensitivity is −80−(−85)=5 dB (relative value). At this point, the received-signal sensitivity information may indicate a received-signal sensitivity (−85 dBm) of the user terminal which has been affected by the terminal self-interference. The degradation value of the received-signal sensitivity may be a degradation value (5 dB) of the received-signal sensitivity of the user terminal which has been affected by the terminal self-interference.

In this embodiment, the first threshold to the fifth threshold may be preset, or specified by a protocol, and the first threshold to the fifth threshold may be the same or different threshold values. In this embodiment, since the determination is performed based on the information reported by the user terminal, it can be accurately determined whether the user terminal experiences terminal self-interference. Further, in this embodiment, the predicted frequency range affected by the terminal self-interference for the terminal is obtained, then, when transmission with the user terminal is performed in this frequency range, transmission with the user terminal may be carried out according to the obtained transmission time domain information, thereby eliminating the terminal self-interference or reducing effects of the terminal self-interference.

Optionally, determining a predicted frequency range affected by the terminal self-interference for the terminal includes:

calculating a first predicted candidate frequency range affected by the terminal self-interference for the terminal in an uplink operating frequency range of the first system, and taking a first target frequency range in the first predicted candidate frequency range as the predicted frequency range. The first target frequency range is in the first predicted candidate frequency range and is in a frequency range of the user terminal in a downlink system bandwidth of the second system.

The above first system may be an LTE system, and the second system may be a 5G New Radio (NR) system. Of course, the embodiment of the present disclosure is not limited thereto, and the first system and the second system may also be two communication systems other than the LTE system and the 5G NR system.

The calculating a first predicted candidate frequency range affected by the terminal self-interference for the user terminal in an uplink operating frequency range of the first system may include: according to corresponding relationship between uplink operating frequency ranges and interference influence frequency ranges, determining the above first predicted candidate frequency range. Or, the above first predicted candidate frequency range may be obtained by performing a specific calculation on the uplink operating frequency range of the first system. For example, when the uplink operating frequency range of the first system (for example, LTE uplink frequency range) is 1720 MHz to 1740 MHz, then, it may be determined that a frequency range in which the user terminal may be affected by the second harmonic interference is 3440 MHz to 3480 MHz, that is, 1720 MHz and 1740 MHz are respectively multiplied by 2. It should be noted that, the above first predicted candidate frequency range may be understood as a frequency range that may be affected by terminal self-interference of the user terminal in the uplink operating frequency range of the first system.

After that, a frequency range, which is in 3440 MHz to 3480 MHz and in a downlink system bandwidth of the second system, is taken as the predicted candidate frequency range. For example, the downlink system bandwidth of the second system (i.e., 5G NR system) is 3460 MHz to 3500 MHz, then, it is finally determined that a frequency range in which the user terminal may be affected by second harmonic interference is in a range of about 3460 MHz to about 3480 MHz, i.e., the above predicted frequency range. Thus, it is determined that the user terminal may be affected by the terminal self-interference in the range of 3460 MHz to 3480 MHz. The above downlink system bandwidth of the second system may be determined according to a second system bandwidth and a center frequency point of the network side.

Optionally, the above determining a predicted frequency range affected by the terminal self-interference for the user terminal includes:

calculating a second predicted candidate frequency range affected by the terminal self-interference for the terminal in an uplink operating frequency range of the first system and an uplink operating frequency range of the second system, and taking a second target frequency range in the second predicted candidate frequency range as the predicted frequency range. The second target frequency range is in the second predicted candidate frequency range and is in a frequency range of the user terminal in a downlink system bandwidth of the first system.

The terminal self-interference of the terminal in the uplink operating frequency range of the first system and the uplink operating frequency range of the second system may be terminal self-interference generated when the user terminal simultaneously transmits uplink signals in the uplink operating frequency range of the first system and the uplink operating frequency range of the second system. Of course, the second predicted candidate frequency range is predicted, i.e., a frequency range, which is determined before the user terminal simultaneously transmits uplink signals in the uplink operating frequency range of the first system and the uplink operating frequency range of the second system and which may be affected by the terminal self-interference generated when the user terminal simultaneously transmits the uplink signals in the uplink operating frequency range of the first system and the uplink operating frequency range of the second system.

In addition, the above calculating a second predicted candidate frequency range affected by the terminal self-interference for the terminal in an uplink operating frequency range of the first system and an uplink operating frequency range of the second system, may include: according to corresponding relationship between uplink operating frequency ranges and interference influence frequency ranges, determining the above second predicted candidate frequency range. Or, the above second predicted candidate frequency range may be obtained by performing a specific calculation on the uplink operating frequency range of the first system and the uplink operating frequency range of the second system. For example, the first system is an LTE system and the second system is a 5G NR system; when the UE is in a dual connectivity mode of operation between LTE and NR, if an uplink frequency range of LTE is 1720 MHz to 1740 MHz and an uplink frequency range of 5G NR is 3485 MHz to 3525 MHz, then, it may be determined that a frequency range in which the user terminal may be affected by the second harmonic interference is LTE downlink frequency in a range of from 1745 MHz (3485-1740) to 1805 MHz (3525-1720). That is, the second predicted candidate frequency range is obtained by subtracting a boundary frequency of the uplink operating frequency range of the first system from a boundary frequency of the uplink operating frequency range of the second system. After that, combining an LTE system bandwidth and a center frequency point of the network side, for example, the LTE system bandwidth is 1765 MHz to 1775 MHz, it is finally determined that a frequency range in which the user terminal may be affected by second harmonic interference is 1765 MHz to 1775 MHz, i.e., the above predicted candidate frequency range. Thus, it is determined that the user terminal may be affected by the terminal self-interference in the range of 1765 MHz to 1775 MHz.

For example, when the first system is an LTE system and the second system is a 5GNR system, the calculation of the first predicted candidate frequency range and the second predicted candidate frequency range may also be as shown in Table 1.

TABLE 1

Calculation of intermodulation interference and second harmonic interference of LTE-5GNR dual connectivity

| | NR uplink frequency f1 (MHz) | LTE uplink frequency f2 (MHz) | frequency affected by second harmonic: 2 * f2 (MHz) | frequency affected by 2nd order intermodulation (IMD2): f1 − f2 (MHz) |
|---|---|---|---|---|
| frequency range | 3400-3600 | 1710-1785 | 3420-3570 | 1615-1890 |

Figure 4:
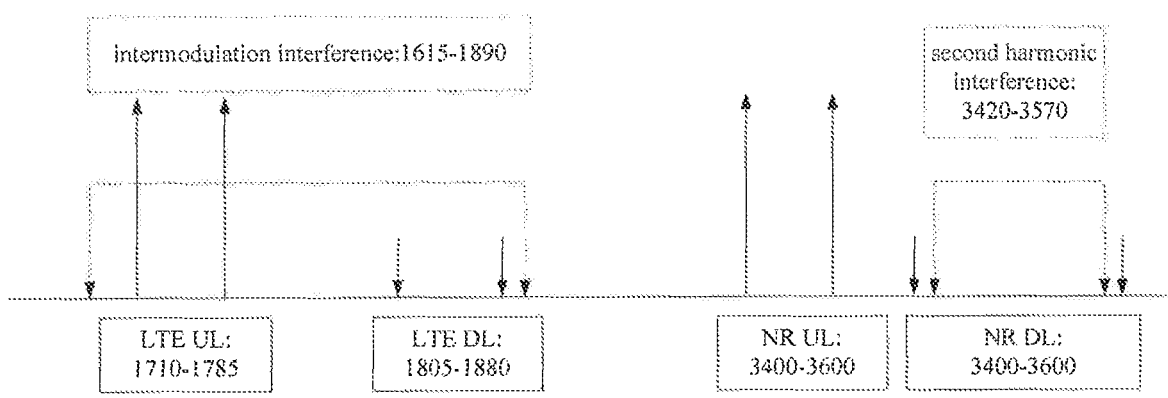
FIG. 4 is a schematic diagram of frequency ranges according to an embodiment of the present disclosure.

In this way, as shown in FIG. 4, if the LTE uplink frequency range is 1710 MHz to 1785 MHz and the 5GNR uplink frequency range is 3400 MHz to 3600 MHz, a predicted frequency range that may be affected by the intermodulation interference in the LTE system is 1615 MHz to 15890 MHz. If the LTE uplink frequency range is 1710 MHz to 1785 MHz, a predicted frequency range that may be affected by the second harmonic interference in the 5GNR system is 3420 MHz to 3570 MHz.

Optionally, the above terminal self-interference includes:

harmonic interference of an uplink signal sent by the user terminal in the first system to a downlink signal received by the user terminal in the second system; or, intermodulation interference of an uplink signal sent by the user terminal in the first system and an uplink signal sent by the user terminal in the second system to a downlink signal received by the user terminal in the first system.

Figure 5:
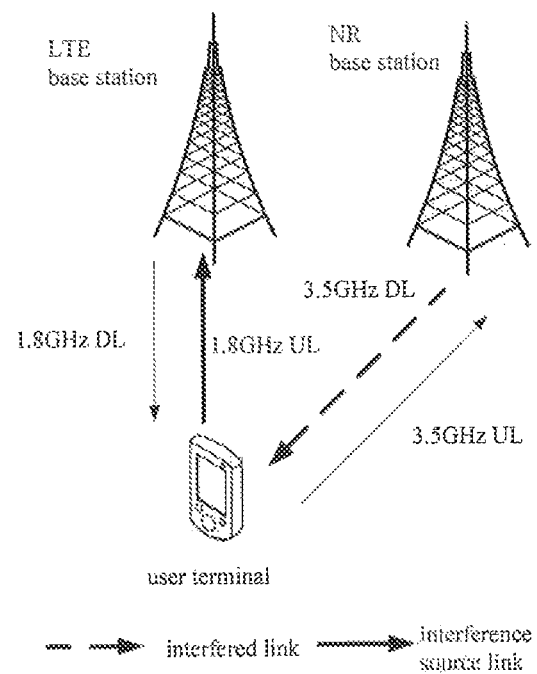
FIG. 5 is a schematic diagram of transmission according to an embodiment of the present disclosure.

In this embodiment, for the harmonic interference, transmission is carried out according to the transmission time domain information, thereby reducing or eliminating the interference. For example in which the first system is an LTE system, the second system is a 5G NR system, and the LTE FDD spectrum of 1.8 GHz and the NR TDD spectrum of 3.5 GHz are used for LTE-5G NR dual connectivity, as shown in FIG. 5, the user terminal establishes communication with an LTE base station and an NR base station. The user terminal sends an uplink signal to the LTE base station in the 1.8 GHz spectrum, and receives a downlink signal sent by the NR base station in the 3.5 GHz spectrum, then the uplink signal generates terminal self-interference to the downlink signal. That is, the uplink signal is an interference source link, and the downlink signal is an interfered link. Preferably, the above harmonic interference may be second harmonic interference or other harmonic interferences.

Figure 6:
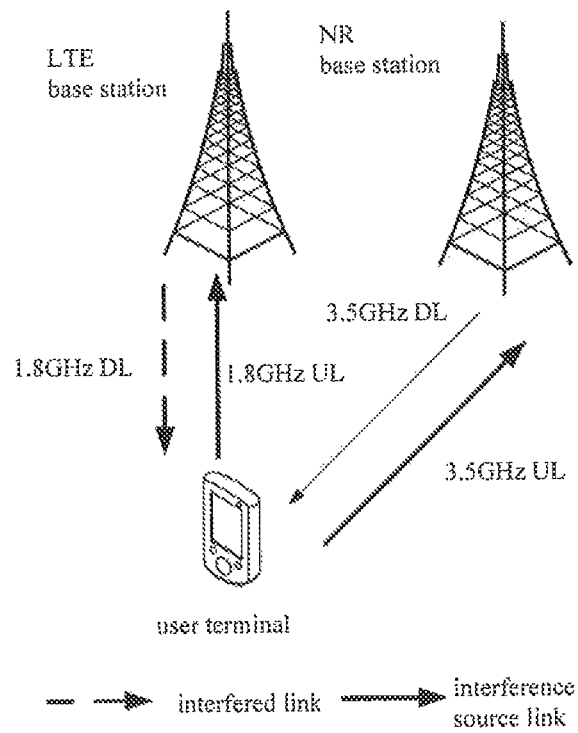
FIG. 6 is a schematic diagram of another transmission according to an embodiment of the present disclosure.

In this embodiment, for the intermodulation interference, transmission is carried out according to the transmission time domain information, thereby reducing or eliminating the interference. For example in which the first system is an LTE system, the second system is a 5G NR system, and the LTE FDD spectrum of 1.8 GHz and the NR TDD spectrum of 3.5 GHz are used for LTE-5G NR dual connectivity, as shown in FIG. 6, the user terminal establishes communication with an LTE base station and an NR base station. The user terminal sends an uplink signal to the LTE base station in the 1.8 GHz spectrum, and simultaneously sends an uplink signal to the NR base station in the 3.5 GHz spectrum, and receives a downlink signal sent by the LTE base station in the 1.8 GHz spectrum, then the two uplink signals generate terminal self-interference to the downlink signal. That is, the two uplink signal is an interference source link, and the downlink signal is an interfered link.

In addition, the above intermodulation interference may be second-order intermodulation (IMD2) and other high-order intermodulation interference. For example, intermodulation interference generated by simultaneous transmission of the user terminal at 1.8 GHz Uplink (UL) and 3.5 GHz UL of the frequency band Band3, includes the second-order intermodulation interference and other high-order intermodulation interference. Other high-order intermodulation such as 3rd order intermodulation (IMD3) will produce near-zero-frequency intermodulation product in mathematical relationship. This product may appear in a Low Noise Amplifier (LNA) output of an LTE receiver. If an isolation of the cascaded mixer is limited in near-zero frequency, the product will leak directly to the output of the mixer and then further affect the reception performance.

It should be noted that, in this embodiment, the step 301 is optional. For example, determining of the terminal self-interference and determining of the predicted frequency range may be performed by the second network device, and implementation of the second network device may be referred to related description of the step 301. When the second network device performs determining, the first network device obtains transmission time domain information of one user terminal experiencing terminal self-interference, and then the first network device defaults to that the user terminal experiences terminal self-interference.

Step 302: obtaining transmission time domain information of the user terminal experiencing terminal self-interference, the transmission time domain information being transmission time domain information of the user terminal after the terminal self-interference occurs at the user terminal.

The above obtaining the transmission time domain information may include receiving the transmission time domain information sent by the second network device or the centralized control unit.

Step 303: carrying out transmission with the user terminal according to the transmission time domain information.

The above transmission may be that the first network device and the second network device adopt time division multiplexing (TDM) mode for transmission. The TDM mode may be that transmission of an uplink signal between the first network device (as an example, the first network device may be a network device in the LTE system) and the user terminal, and transmission of a downlink signal between the second network device and the user terminal, are performed in the TDM mode, thereby preventing the uplink signal between the first network device and the user terminal and the downlink signal between the second network device from being transmitted simultaneously, and then eliminating harmonic terminal self-interference. Alternatively, the TDM mode may be that when an uplink signal between the first network device (as an example, the first network device may be a network device in the LTE system) and the user terminal, and a downlink signal between the first network device and the user terminal, are transmitted simultaneously, at this moment, an uplink signal between the second network device and the user terminal cannot be transmitted. In this way, the uplink-downlink signals between the first network device and the user terminal are transmitted simultaneously, and transmission of the uplink signal between the second network device and the user terminal is avoided at this moment, thereby eliminating intermodulation terminal self-interference.

Optionally, the obtaining transmission time domain information of the user terminal experiencing terminal self-interference, includes:

receiving transmission time domain information sent by the second network device. The transmission time domain information includes location information of time domain resources. The time domain resources include available time domain resources for transmission between the first network device and the user terminal, or include time domain resources to be occupied by transmission between the second network device and the user terminal.

When the time domain resource includes the available time domain resources for transmission between the first network device and the user terminal, the time domain resources may be available time domain resources for transmission between the first network device and the user terminal, which are obtained by the second network device according to a scheduling result of the second network device to the user terminal. When transmission between the first network device and the user terminal is performed in the above time domain resources, the terminal self-interference of the user terminal can be eliminated. For example, the second network device is a network device in the 5G NR system, time domain resources to be occupied by transmission between the second network device and the user terminal include subframes 1, 3, 5, 7 and 9 in one period, and these subframes are used for downlink transmission with the user terminal; then, the available time domain resources for uplink transmission between the first network device and the user terminal include subframes 2, 4, 6, 8 and 10, and downlink transmission between the first network device and the user terminal may not be limited. For another example, the second network device is a network device in the LTE system, time domain resources to be occupied by transmission between the second network device and the user terminal include subframes 1, 3, 5, 7 and 9 in one period, and plink transmission and downlink transmission with the user terminal are simultaneously performed in these subframes; then, the available time domain resources for uplink transmission between the first network device and the user terminal include subframes 2, 4, 6, 8 and 10, and downlink transmission between the first network device and the user terminal may not be limited.

The time domain resources include time domain resources to be occupied by transmission between the second network device and the user terminal, according to these time domain resources, the first network device can determine available time domain resources of the first network device.

In addition, receiving transmission time domain information sent by the second network device may be transmission through an interface between the first network device and the second network device, or transmission between the two network side devices through the core network.

Optionally, carrying out transmission with the user terminal according to the transmission time domain information, includes:

when the time domain resources include available time domain resources for transmission between the first network device and the user terminal, carrying out transmission with the user terminal in the available time domain resources for transmission between the first network device and the user terminal; or, when the time domain resources include time domain resources to be occupied by transmission between the second network device and the user terminal, determining available time domain resources for transmission between the first network device and the user terminal according to the time domain resources to be occupied by transmission between the second network device and the user terminal; and carrying out transmission with the user terminal in the available time domain resources for transmission between the first network device and the user terminal.

In this embodiment, transmission between the first network device and the user terminal can be carried out in the available time domain resources for transmission between the first network device and the user terminal, thereby eliminating the terminal self-interference of the user terminal.

Optionally, obtaining transmission time domain information of a user terminal experiencing terminal self-interference, includes:

obtaining transmission time domain information allocated by the centralized control unit, where the transmission time domain information includes location information of time domain resources, and the time domain resources include available time domain resources for transmission between the first network device and the user terminal.

The above time domain resources may be allocated by the centralized control unit, and the terminal self-interference of the user terminal may be eliminated when transmission between the first network device and the user terminal is carried out in the above time domain resources. For example, the time domain resources indicate that the first network device and the second network device adopt time division multiplexing (TDM) mode for transmission. The TDM mode may refer to the foregoing description about TDM.

In this embodiment, since the transmission time domain information is allocated by the centralized control unit, the centralized control unit can configure the TDM mode for the first network device and the second network device to eliminate the terminal self-interference of the user terminal.

Optionally, in the above implementation manner of receiving transmission time domain information sent by the second network device or the centralized control unit, the location information includes bitmap information of time domain resources and an identification of the user terminal (UE ID), and also includes one or more of the following: start time, end time and duration.

Figure 7:
FIG. 7 is a schematic diagram of location information according to an embodiment of the present disclosure.
Figure 8:
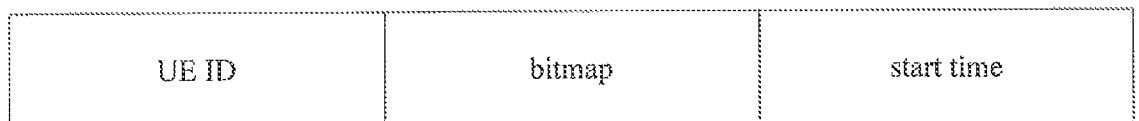
FIG. 8 is a schematic diagram of another location information according to an embodiment of the present disclosure.

In this embodiment, the location information may be as shown in FIG. 7 or FIG. 8. When the location information does not include the end time or the duration of the time domain resource (as shown in FIG. 8), the first network device may receive from the second network device or the centralized control unit a notification message for deactivating the user terminal, and deactivate the user terminal according to the notification message.

Optionally, the time domain resources include time domain resources corresponding to a Hybrid Automatic Repeat Request (HARQ) process, and the bitmap information includes bitmap information of the HARQ process.

In this embodiment, transmission for terminal self-interference may be performed based on the bitmap information of the HARQ process. For example, there are eight HARQ processes at the second network device (LTE FDD system), and the second network device sends a sequence of 01010101, which represents that the second network device will schedule the user terminal on the HARQ processes 1, 3, 5 and 7, and not schedule the user terminal on the HARQ processes 0, 2, 4 and 8. That is, available resources of the first network device are time domain resources corresponding to the HARQ processes 0, 2, 4 and 8. It should be noted that the time domain resources corresponding to the HARQ process may be predefined. For example, one HARQ process corresponds to one time slot, one subframe or one symbol, and the like.

Optionally, the time domain resource includes a slot, then the bitmap information includes bitmap information of the slot; or, the time domain resource includes a subframe, then the bitmap information includes bitmap information of the subframe.

In this embodiment, transmission for terminal self-interference is performed based on the bitmap information of the slot or the subframe. For example, the second network device (LTE system) sends a sequence of 0101010101, which represents that the second network device schedules the user terminal in subframes 1, 3, 5, 7 and 9 in a period of 10 subframes, and does not schedule the user terminal in subframes 0, 2, 4, 8 and 10. That is, the subframes 0, 2, 4, 8 and 10 are available for the first network device.

Optionally, the time domain resources include a slot group, then the bitmap information includes bitmap information of the slot group; or the time domain resources include a subframe group, then the bitmap information includes bitmap information of the subframe group.

In this embodiment, transmission for terminal self-interference is performed based on the bitmap information of the slot group or the subframe group. For example, the second network device (LTE system) sends a sequence of 01010, and each bit represents one subframe group. For example, each subframe group contains two consecutive subframes. The meaning of the bitmap is that the second network device schedules the user terminal in subframe groups 1 and 3 in a period of 10 subframes (5 subframe groups), and does not schedule the user terminal in subframe groups 0, 2 and 4. That is, the subframe groups 0, 2 and 4 are available for the first network device.

It should be noted that in the above examples, each bit indicates a time domain resource (for example, a subframe or a slot) for transmission or not transmission. In one embodiment of the present disclosure, the bitmap information may also represent a time domain resource with multiple bits. For example, two bits are used to represent a state of one subframe or slot, where 00 indicates no transmission, 01 indicates transmission with a transmission power being smaller than a threshold (which is smaller than the maximum transmission power), and 10 indicates transmission with a transmission power being not greater than the maximum transmission power, and 11 is reserved meaning.

Optionally, carrying out transmission with the user terminal according to the transmission time domain information, includes:

when the first network device is a network device of the second system and the second network device is a network device of the first system, carrying out uplink transmission with the user terminal in a first time domain resource according to the transmission time domain information, where the first time domain resource is a time domain resource other than time domain resources in which the second network device and the user terminal simultaneously perform uplink transmission and downlink transmission.

In this embodiment, the intermodulation interference of the user terminal can be eliminated.

Optionally, carrying out transmission with the user terminal according to the transmission time domain information, includes:

when the first network device is a network device of the first system and the second network device is a network device of the second system, carrying out uplink transmission or downlink transmission with the user terminal in a second time domain resource according to the transmission time domain information, where the second time domain resource is a time domain resource occupied by uplink transmission between the second network device and the user terminal.

In this embodiment, the intermodulation interference of the user terminal can be eliminated.

Optionally, carrying out transmission with the user terminal according to the transmission time domain information, includes:

when the first network device is a network device of the second system and the second network device is a network device of the first system, carrying out downlink transmission with the user terminal in a third time domain resource according to the transmission time domain information, where the third time domain resource is a time domain resource other than time domain resources occupied by uplink transmission between the second network device and the user terminal.

In this embodiment, harmonic interference of the user terminal can be eliminated.

Optionally, carrying out transmission with the user terminal according to the transmission time domain information, includes:

when the first network device is a network device of the first system and the second network device is a network device of the second system, carrying out uplink transmission with the user terminal in a fourth time domain resource according to the transmission time domain information, where the fourth time domain resource is a time domain resource other than time domain resources occupied by downlink transmission between the second network device and the user terminal.

In this embodiment, harmonic interference of the user terminal can be eliminated.

It should be noted that the above four embodiments may be implemented together with the location information of the time domain resources sent by the second network device or the centralized control unit. For example, available time domain resources for transmission between the first network device and the user terminal include: available time domain resources for uplink transmission between the first network device and the user terminal being the above first time domain resource; or, the time domain resource occupied by transmission between the second network device and the user terminal includes: time domain resources in which the second network device and the user terminal simultaneously perform uplink transmission and downlink transmission; or, available time domain resources for transmission between the first network device and the user terminal include: available time domain resources for uplink transmission or downlink transmission between the first network device and the user terminal being the second time domain resource, that is, the first network device cannot simultaneously perform uplink transmission and downlink transmission in the second time domain resource, or others not listed here.

In this embodiment, after determining that the user terminal experiences self-interference, transmission with the user terminal is carried out according to the obtained transmission time domain information for the terminal self-interference, thereby eliminating the terminal self-interference or reducing effects of the terminal self-interference.

Figure 9:
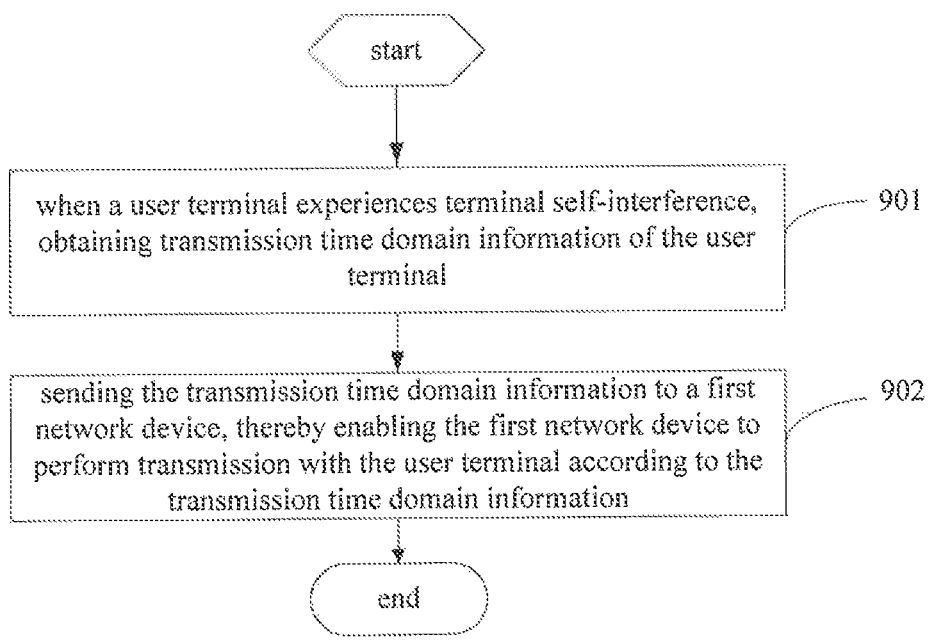
FIG. 9 is a flowchart of another transmission method for terminal self-interference according to an embodiment of the present disclosure.

Referring to FIG. 9, FIG. 9 is a flowchart of another transmission method for terminal self-interference according to an embodiment of the present disclosure. The method is applied to a second network device. As shown in FIG. 9, the method includes the following steps:

Step 901: when a user terminal experiences terminal self-interference, obtaining transmission time domain information of the user terminal, the transmission time domain information being transmission time domain information of the user terminal after the terminal self-interference occurs at the user terminal.

Step 902: sending the transmission time domain information to a first network device, thereby enabling the first network device to perform transmission with the user terminal according to the transmission time domain information.

The transmission time domain information includes location information of time domain resources. The time domain resources include available time domain resources for transmission between the first network device and the user terminal, or include time domain resources to be occupied by transmission between the second network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or the time domain resources include a subframe group, then the bitmap information includes bitmap information of the subframe group.

Optionally, when the user terminal experiences terminal self-interference, before obtaining transmission time domain information of the user terminal, the method further includes:

determining whether the user terminal experiences terminal self-interference; when the user terminal experiences terminal self-interference, determining a predicted frequency range affected by the terminal self-interference for the terminal.

It should be noted that this embodiment is an implementation manner of the second network device corresponding to the embodiment shown in FIG. 2 and FIG. 3, and a specific implementation manner thereof may be referred to the related description of the embodiment shown in FIG. 2 and FIG. 3. The same beneficial effects can be achieved. In order to avoid repeated explanation, details will not be repeated here.

Figure 10:
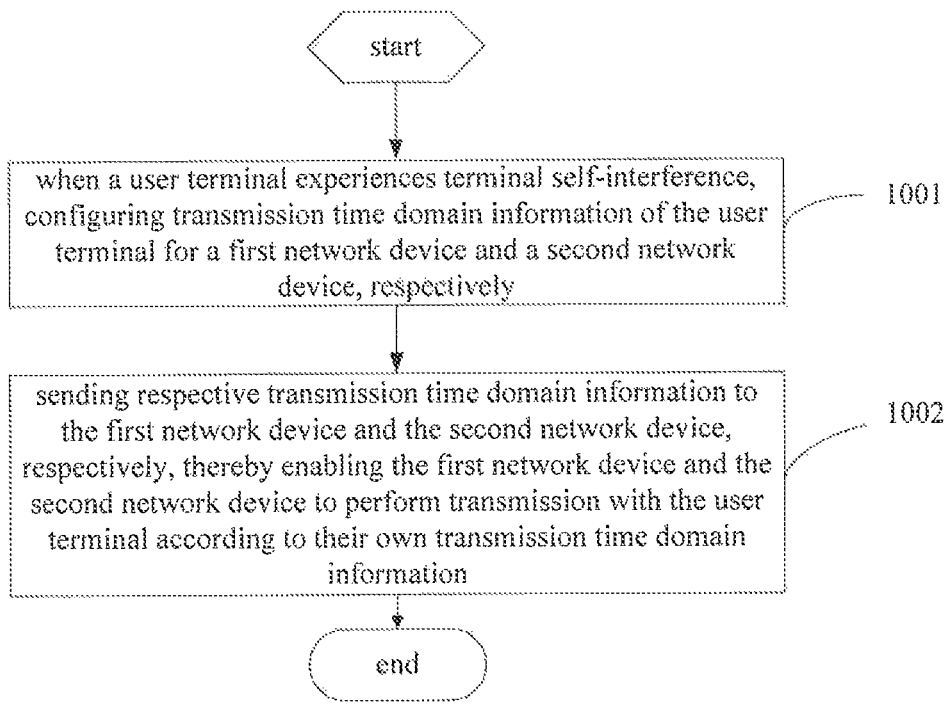
FIG. 10 is a flowchart of another transmission method for terminal self-interference according to an embodiment of the present disclosure.

Referring to FIG. 10, FIG. 10 is a flowchart of another transmission method for terminal self-interference according to an embodiment of the present disclosure. The method is applied to a centralized control unit. As shown in FIG. 10, the method includes the following steps.

Step 1001: when a user terminal experiences terminal self-interference, configuring transmission time domain information of the user terminal for a first network device and a second network device, respectively, the transmission time domain information being transmission time domain information of the user terminal after the terminal self-interference occurs at the user terminal.

Step 1002: sending respective transmission time domain information to the first network device and the second network device, respectively, thereby enabling the first network device and the second network device to perform transmission with the user terminal according to their own transmission time domain information.

Optionally, the transmission time domain information of the first network device includes location information of available time domain resources for transmission between the first network device and the user terminal;

the transmission time domain information of the second network device includes location information of available time domain resources for transmission between the second network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or the time domain resources include a subframe group, then the bitmap information includes bitmap information of the subframe group.

It should be noted that this embodiment is an implementation manner of the centralized control unit corresponding to the embodiment shown in FIG. 2 and FIG. 3, and a specific implementation manner thereof may be referred to the related description of the embodiment shown in FIG. 2 and FIG. 3. The same beneficial effects can be achieved. In order to avoid repeated explanation, details will not be repeated here.

Figure 11:
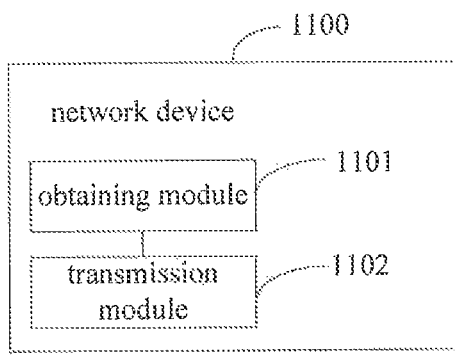
FIG. 11 is a structural diagram of a network device according to an embodiment of the present disclosure.

Referring to FIG. 11, FIG. 11 is a structural diagram of a network device according to an embodiment of the present disclosure. The network device is the first network device, and can implement details of the transmission method for terminal self-interference of the embodiment shown in FIG. 2 and FIG. 3 with the same effect being achieved. As shown in FIG. 11, the network device 1100 includes:

an obtaining module 1101 configured to obtain transmission time domain information of a user terminal experiencing terminal self-interference, the transmission time domain information being transmission time domain information of the user terminal after the terminal self-interference occurs at the user terminal; and, a transmission module 1102 configured to carry out transmission with the user terminal according to the transmission time domain information.

Optionally, the obtaining module 1101 is configured to receive transmission time domain information sent by the second network device. The transmission time domain information includes location information of time domain resources. The time domain resources include available time domain resources for transmission between the first network device and the user terminal, or include time domain resources to be occupied by transmission between the second network device and the user terminal.

Optionally, the transmission module 1102 is configured to, when the time domain resources include available time domain resources for transmission between the first network device and the user terminal, carry out transmission with the user terminal in the available time domain resources for transmission between the first network device and the user terminal; or, the transmission module 1102 is configured to, when the time domain resources include time domain resources to be occupied by transmission between the second network device and the user terminal, determine available time domain resources for transmission between the first network device and the user terminal according to the time domain resources to be occupied by transmission between the second network device and the user terminal, and carry out transmission with the user terminal in the available time domain resources for transmission between the first network device and the user terminal.

Optionally, the obtaining module 1101 is configured to obtain transmission time domain information allocated by the centralized control unit, where the transmission time domain information includes location information of time domain resources, and the time domain resources include available time domain resources for transmission between the first network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or the time domain resources include a subframe group, then the bitmap information includes bitmap information of the subframe group.

Optionally, the transmission module 1102 is configured to, when the first network device is a network device of the second system and the second network device is a network device of the first system, carry out uplink transmission with the user terminal in a first time domain resource according to the transmission time domain information, where the first time domain resource is a time domain resource other than time domain resources in which the second network device and the user terminal simultaneously perform uplink transmission and downlink transmission; or, the transmission module 1102 is configured to, when the first network device is a network device of the first system and the second network device is a network device of the second system, carry out uplink transmission or downlink transmission with the user terminal in a second time domain resource according to the transmission time domain information, where the second time domain resource is a time domain resource occupied by uplink transmission between the second network device and the user terminal; or, the transmission module 1102 is configured to, when the first network device is a network device of the second system and the second network device is a network device of the first system, carry out downlink transmission with the user terminal in a third time domain resource according to the transmission time domain information, where the third time domain resource is a time domain resource other than time domain resources occupied by uplink transmission between the second network device and the user terminal; or, the transmission module 1102 is configured to, when the first network device is a network device of the first system and the second network device is a network device of the second system, carry out uplink transmission with the user terminal in a fourth time domain resource according to the transmission time domain information, where the fourth time domain resource is a time domain resource other than time domain resources occupied by downlink transmission between the second network device and the user terminal.

Figure 12:
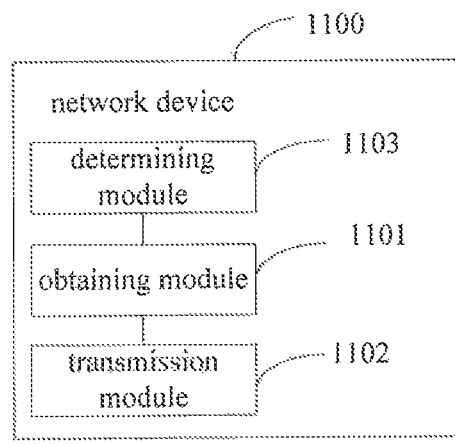
FIG. 12 is a structural diagram of another network device according to an embodiment of the present disclosure.

Optionally, as shown in FIG. 12, the network device 1100 further includes:

a determining module 1103 configured to determine whether the user terminal experiences terminal self-interference; when the user terminal experiences terminal self-interference, determine a predicted frequency range affected by the terminal self-interference for the terminal.

Optionally, the determining module 1103 is configured to, determine whether a terminal self-interference isolation reported by the user terminal is smaller than a preset first threshold; when the terminal self-interference isolation is smaller than the preset first threshold, determine that the user terminal experiences terminal self-interference; or, the determining module 1103 is configured to, determine whether a downlink packet loss rate reported by the user terminal is greater than a preset second threshold; when the downlink packet loss rate is greater than the preset second threshold, determine that the user terminal experiences terminal self-interference; or, the determining module 1103 is configured to, determine whether a downlink interference level reported by the user terminal is greater than a preset third threshold; when the downlink interference level is greater than the preset third threshold, determine that the user terminal experiences terminal self-interference; or, the determining module 1103 is configured to, determine whether a received-signal sensitivity reported by the user terminal is greater than a preset fourth threshold; when the received-signal sensitivity is greater than the preset fourth threshold, determine that the user terminal experiences terminal self-interference; or, the determining module 1103 is configured to, determine whether a degradation value of the received-signal sensitivity reported by the user terminal is greater than a preset fifth threshold; when the degradation value of the received-signal sensitivity is greater than the preset fifth threshold, determine that the user terminal experiences terminal self-interference.

Optionally, the determining module 1103 is configured to, calculate a first predicted candidate frequency range affected by the terminal self-interference for the user terminal in an uplink operating frequency range of the first system, and take a first target frequency range in the first predicted candidate frequency range as the predicted frequency range; where the first target frequency range is in the first predicted candidate frequency range and is in a frequency range of the user terminal in a downlink system bandwidth of the second system; or, the determining module 1103 is configured to, calculate a second predicted candidate frequency range affected by the terminal self-interference for the user terminal in an uplink operating frequency range of the first system and an uplink operating frequency range of the second system, and take a second target frequency range in the second predicted candidate frequency range as the predicted frequency range; where the second target frequency range is in the second predicted candidate frequency range and is in a frequency range of the user terminal in a downlink system bandwidth of the first system.

It should be noted that, the network device 1100 in the embodiment may be the first network device in any of the method embodiments of the present disclosure, and the first network device in the method embodiments of the present disclosure can be implemented by the network device 1100 in the embodiment with the same beneficial effects achieved, and details are not described herein again.

Figure 13:
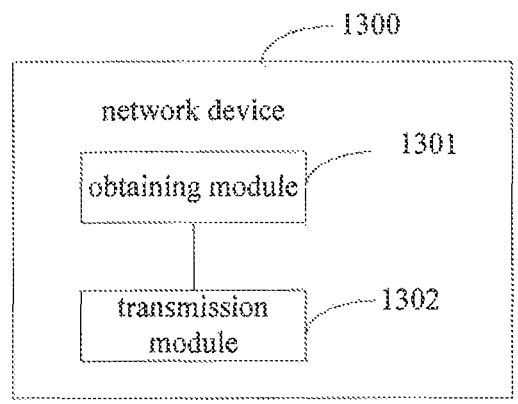
FIG. 13 is a structural diagram of another network device according to an embodiment of the present disclosure.

Referring to FIG. 13, FIG. 13 is a structural diagram of another network device according to an embodiment of the present disclosure. The network device is a second network device, and can implement details of the transmission method for terminal self-interference of the embodiment shown in FIG. 9 with the same effect being achieved. As shown in FIG. 13, the network device 1300 includes:

an obtaining module 1301 configured to, when a user terminal experiences terminal self-interference, obtain transmission time domain information of the user terminal, the transmission time domain information being transmission time domain information of the user terminal after the terminal self-interference occurs at the user terminal; and, a transmission module 1302 configured to, send the transmission time domain information to a first network device, thereby enabling the first network device to perform transmission with the user terminal according to the transmission time domain information.

Optionally, the transmission time domain information includes location information of time domain resources. The time domain resources include available time domain resources for transmission between the first network device and the user terminal, or include time domain resources to be occupied by transmission between the second network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or the time domain resources include a subframe group, then the bitmap information includes bitmap information of the subframe group.

Figure 14:
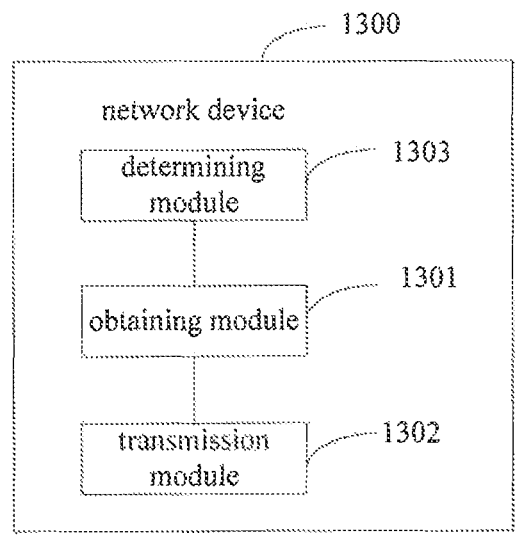
FIG. 14 is a structural diagram of another network device according to an embodiment of the present disclosure.

Optionally, as shown in FIG. 14, the network device 1300 further includes:

a determining module 1303 configured to determine whether the user terminal experiences terminal self-interference; when the user terminal experiences terminal self-interference, determine a predicted frequency range affected by the terminal self-interference for the terminal.

It should be noted that, the network device 1300 in the embodiment may be the second network device in any of the method embodiments of the present disclosure, and the second network device in any of the method embodiments of the embodiments may be implemented by the network device 1300 in the embodiment with the same beneficial effects being achieved, and details are not described herein again.

Figure 15:
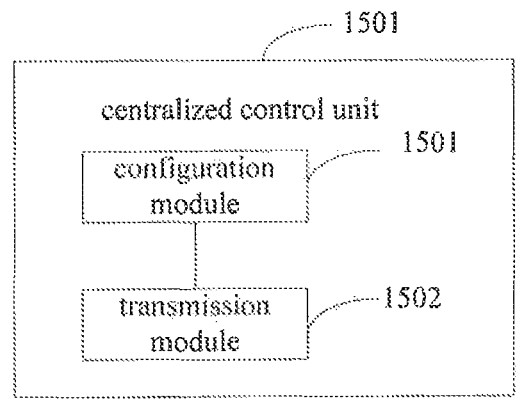
FIG. 15 is a structural diagram of a centralized control unit according to an embodiment of the present disclosure.

Referring to FIG. 15, FIG. 15 is a structural diagram of a centralized control unit according to an embodiment of the present disclosure. The centralized control unit can implement details of the transmission method for terminal self-interference of the embodiment shown in FIG. 10, and achieve the same effect. As shown in FIG. 15, the centralized control unit 1500 includes:

a configuration module 1501 configured to, when a user terminal experiences terminal self-interference, configure transmission time domain information of the user terminal for a first network device and a second network device, respectively, the transmission time domain information being transmission time domain information of the user terminal after the terminal self-interference occurs at the user terminal;

a transmission module 1502 configured to send respective transmission time domain information to the first network device and the second network device, respectively, thereby enabling the first network device and the second network device to perform transmission with the user terminal according to their own transmission time domain information.

Optionally, the transmission time domain information of the first network device includes location information of available time domain resources for transmission between the first network device and the user terminal;

the transmission time domain information of the second network device includes location information of available time domain resources for transmission between the second network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or the time domain resources include a subframe group, then the bitmap information includes bitmap information of the subframe group.

It should be noted that, the centralized control unit 1500 in the embodiment may be the centralized control unit in any of the method embodiments of the present disclosure, and the centralized control unit in any of the method embodiments of the embodiments may be implemented by the centralized control unit 1500 in the embodiment with the same beneficial effects being achieved, and details are not described herein again.

Figure 16:
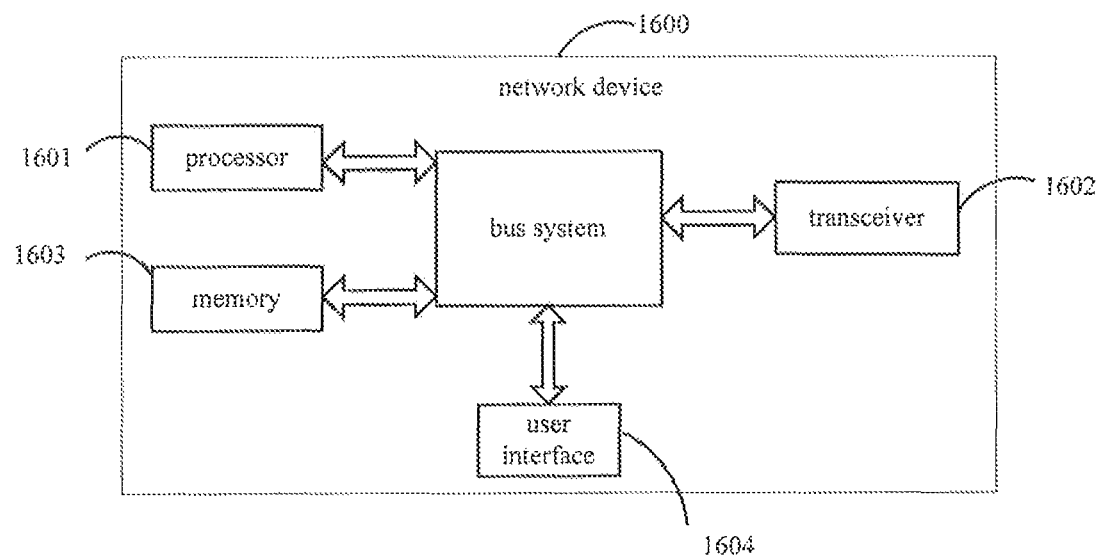
FIG. 16 is a structural diagram of another network device according to an embodiment of the present disclosure.

Referring to FIG. 16, FIG. 16 is a structural diagram of a network device according to an embodiment of the present disclosure. The network device is a first network device, and can implement details of the transmission method for terminal self-interference of the embodiment shown in FIG. 2 and FIG. 3 with the same effect being achieved. As shown in FIG. 16, the network device 1600 includes a processor 1601, a transceiver 1602, a memory 1603, a user interface 1604, and a bus system.

The processor 1601 is configured to read a program in the memory 1603 and perform the following process:

obtaining transmission time domain information of a user terminal experiencing terminal self-interference, the transmission time domain information being transmission time domain information of the user terminal after the terminal self-interference occurs at the user terminal;

carrying out transmission with the user terminal according to the transmission time domain information.

The transceiver 1602 is configured to receive and transmit data under the control of the processor 1601.

In FIG. 16, the bus architecture may include any number of interconnected buses and bridges. Specifically, various circuits of one or more processors, which are represented by the processor 1601, and the storage, which is represented by the memory 1603, are linked together. The bus architecture may link various other circuits, such as a peripheral device, voltage regulator and a power management circuit together. These features are well known in this field, therefore, this disclosure does not make further description on these features. The bus interface provides an interface. The transceiver 1602 can be multiple elements, including a transmitter and a receiver and provide units, which communicate with other devices on the transmission medium. For different user equipment, the user interface 1604 may also be an interface capable of externally connecting required devices, including but not limited to a keypad, a monitor, a speaker, a microphone, a joystick, and the like.

The processor 1601 is responsible for managing the bus architecture and common processing and the memory 1603 may store data used by the processor 1601 when executing the operations.

Optionally, the processor 1601 implements obtaining transmission time domain information of the user terminal experiencing terminal self-interference in a way including:

receiving the transmission time domain information sent by the second network device; where the transmission time domain information includes location information of time domain resources, the time domain resources include available time domain resources for transmission between the first network device and the user terminal, or include time domain resources to be occupied by transmission between the second network device and the user terminal.

Optionally, the processor 1601 implements carrying out transmission with the user terminal according to the transmission time domain information in a way including:

when the time domain resources include available time domain resources for transmission between the first network device and the user terminal, carrying out transmission with the user terminal in the available time domain resources for transmission between the first network device and the user terminal; or, when the time domain resources include time domain resources to be occupied by transmission between the second network device and the user terminal, determining available time domain resources for transmission between the first network device and the user terminal according to the time domain resources to be occupied by transmission between the second network device and the user terminal, and carrying out transmission with the user terminal in the available time domain resources for transmission between the first network device and the user terminal.

Optionally, the processor 1601 implements obtaining transmission time domain information of the user terminal experiencing terminal self-interference in a way including:

obtaining transmission time domain information allocated by the centralized control unit, where the transmission time domain information includes location information of time domain resources, and the time domain resources include available time domain resources for transmission between the first network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe: or, the time domain resources include a slot group, then the bitmap information includes bitmap information of the slot group; or the time domain resources include a subframe group, then the bitmap information includes bitmap information of the subframe group.

Optionally, the processor 1601 implements carrying out transmission with the user terminal according to the transmission time domain information in a way including:

when the first network device is a network device of the second system and the second network device is a network device of the first system, carrying out uplink transmission with the user terminal in a first time domain resource according to the transmission time domain information, where the first time domain resource is a time domain resource other than time domain resources in which the second network device and the user terminal simultaneously perform uplink transmission and downlink transmission; or, when the first network device is a network device of the first system and the second network device is a network device of the second system, carrying out uplink transmission or downlink transmission with the user terminal in a second time domain resource according to the transmission time domain information, where the second time domain resource is a time domain resource occupied by uplink transmission between the second network device and the user terminal; or, when the first network device is a network device of the second system and the second network device is a network device of the first system, carrying out downlink transmission with the user terminal in a third time domain resource according to the transmission time domain information, where the third time domain resource is a time domain resource other than time domain resources occupied by uplink transmission between the second network device and the user terminal; or, when the first network device is a network device of the first system and the second network device is a network device of the second system, carrying out uplink transmission with the user terminal in a fourth time domain resource according to the transmission time domain information, where the fourth time domain resource is a time domain resource other than time domain resources occupied by downlink transmission between the second network device and the user terminal.

Optionally, before obtaining transmission time domain information of the user terminal experiencing terminal self-interference, the processor 1601 is further configured to, determine whether the user terminal experiences terminal self-interference; when the user terminal experiences terminal self-interference, determine a predicted frequency range affected by the terminal self-interference for the terminal.

Optionally, the processor 1601 implements determining whether the user terminal experiences terminal self-interference in a way including:

determining whether a terminal self-interference isolation reported by the user terminal is smaller than a preset first threshold; when the terminal self-interference isolation is smaller than the preset first threshold, determining that the user terminal experiences terminal self-interference; or, determining whether a downlink packet loss rate reported by the user terminal is greater than a preset second threshold; when the downlink packet loss rate is greater than the preset second threshold, determining that the user terminal experiences terminal self-interference; or, determining whether a downlink interference level reported by the user terminal is greater than a preset third threshold; when the downlink interference level is greater than the preset third threshold, determining that the user terminal experiences terminal self-interference; or, determining whether a received-signal sensitivity reported by the user terminal is greater than a preset fourth threshold; when the received-signal sensitivity is greater than the preset fourth threshold, determining that the user terminal experiences terminal self-interference; or, determining whether a degradation value of the received-signal sensitivity reported by the user terminal is greater than a preset fifth threshold; when the degradation value of the received-signal sensitivity is greater than the preset fifth threshold, determining that the user terminal experiences terminal self-interference.

Optionally, the processor 1601 implements determining a predicted frequency range affected by the terminal self-interference for the terminal in a way including:

calculating a first predicted candidate frequency range affected by the terminal self-interference for the user terminal in an uplink operating frequency range of the first system, and taking a first target frequency range in the first predicted candidate frequency range as the predicted frequency range; where the first target frequency range is in the first predicted candidate frequency range and is in a frequency range of the user terminal in a downlink system bandwidth of the second system; or, calculating a second predicted candidate frequency range affected by the terminal self-interference for the user terminal in an uplink operating frequency range of the first system and an uplink operating frequency range of the second system, and taking a second target frequency range in the second predicted candidate frequency range as the predicted frequency range; where the second target frequency range is in the second predicted candidate frequency range and is in a frequency range of the user terminal in a downlink system bandwidth of the first system.

It should be noted that, the network device 1600 in the embodiment may be the first network device in any of the method embodiments of the present disclosure, and the first network device in the method embodiments of the present disclosure can be implemented by the network device 1600 in the embodiment with the same beneficial effects achieved, and details are not described herein again.

Figure 17:
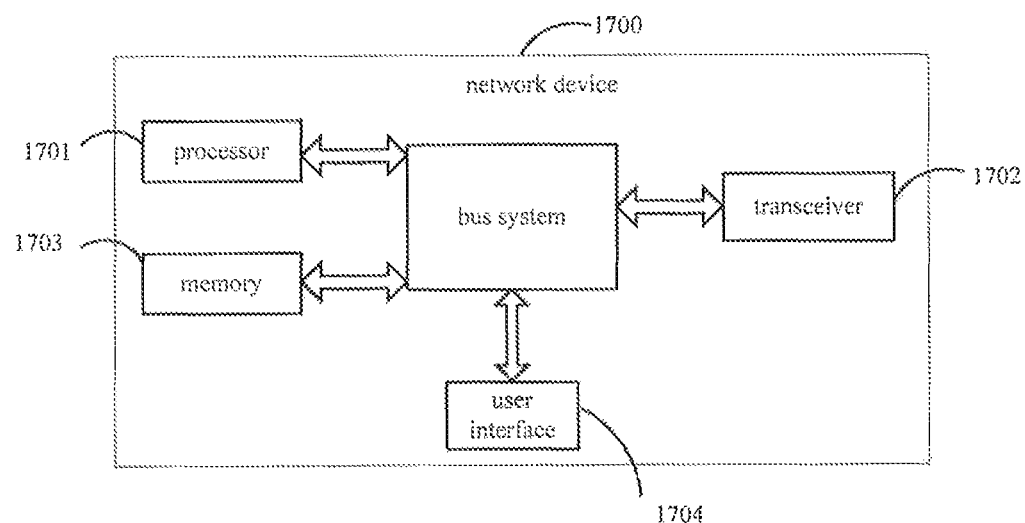
FIG. 17 is a structural diagram of another network device according to an embodiment of the present disclosure.

Referring to FIG. 17, FIG. 17 is a structural diagram of a network device according to an embodiment of the present disclosure. The network device is a second network device, and can implement details of the transmission method for terminal self-interference of the embodiment shown in FIG. 9 with the same effect being achieved. As shown in FIG. 17, the network device 1700 includes a processor 1701, a transceiver 1702, a memory 1703, a user interface 1704, and a bus system.

The processor 1701 is configured to read a program in the memory 1703 and perform the following process:

when a user terminal experiences terminal self-interference, obtaining transmission time domain information of the user terminal, the transmission time domain information being transmission time domain information of the user terminal after the terminal self-interference occurs at the user terminal; and sending the transmission time domain information to a first network device, thereby enabling the first network device to perform transmission with the user terminal according to the transmission time domain information.

The transceiver 1702 is configured to receive and transmit data under the control of the processor 1701.

In FIG. 17, the bus architecture may include any number of interconnected buses and bridges. Specifically, various circuits of one or more processors, which are represented by the processor 1701, and the storage, which is represented by the memory 1703, are linked together. The bus architecture may link various other circuits, such as a peripheral device, voltage regulator and a power management circuit together. These features are well known in this field, therefore, this disclosure does not make further description on these features. The bus interface provides an interface. The transceiver 1702 can be multiple elements, including a transmitter and a receiver and provide units, which communicate with other devices on the transmission medium. For different user equipment, the user interface 1704 may also be an interface capable of externally connecting required devices, including but not limited to a keypad, a monitor, a speaker, a microphone, a joystick, and the like.

The processor 1701 is responsible for managing the bus architecture and common processing and the memory 1703 may store data used by the processor 1701 when executing the operations.

Optionally, the transmission time domain information includes location information of time domain resources. The time domain resources include available time domain resources for transmission between the first network device and the user terminal, or include time domain resources to be occupied by transmission between the second network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or, the time domain resources include a subframe group, then the bitmap information includes bitmap information of the subframe group.

Optionally, when the user terminal experiences terminal self-interference, before obtaining transmission time domain information of the user terminal, the processor 1701 is further configured to:

determine whether the user terminal experiences terminal self-interference; when the user terminal experiences terminal self-interference, determine a predicted frequency range affected by the terminal self-interference for the terminal.

It should be noted that the network device 1700 in the embodiment may be the second network device in any of the method embodiments of the present disclosure, and the second network device in the method embodiments of the present disclosure can be implemented by the network device 1700 in the embodiment with the same beneficial effects achieved, and details are not described herein again.

Figure 18:
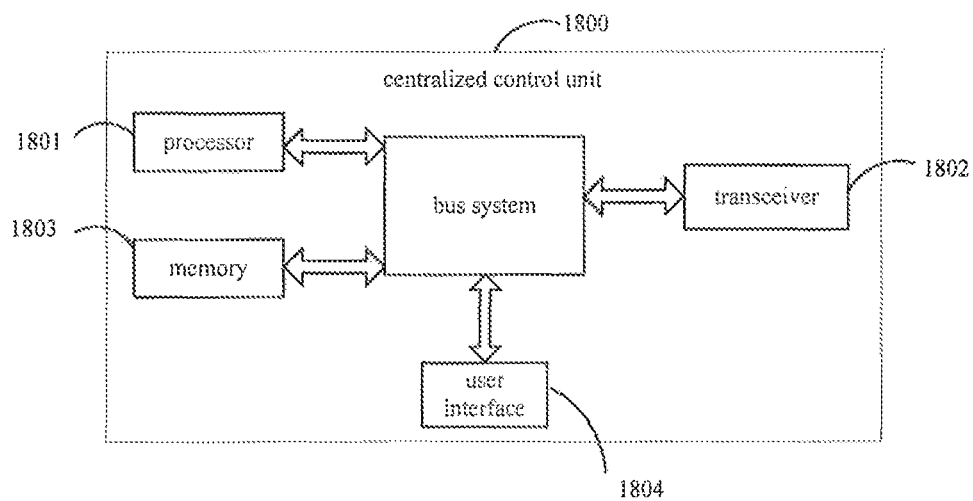
FIG. 18 is a structural diagram of another centralized control unit according to an embodiment of the present disclosure.

Referring to FIG. 18, FIG. 18 is a structural diagram of a centralized control unit according to an embodiment of the present disclosure. The centralized control unit can implement details of the transmission method for terminal self-interference of the embodiment shown in FIG. 10 with the same effect being achieved. As shown in FIG. 18, the centralized control unit 1800 includes a processor 1801, a transceiver 1802, a memory 1803, a user interface 1804 and a bus system.

The processor 1801 is configured to read a program in the memory 1803 and perform the following process:

when a user terminal experiences terminal self-interference, configuring transmission time domain information of the user terminal for a first network device and a second network device, respectively, the transmission time domain information being transmission time domain information of the user terminal after the terminal self-interference occurs at the user terminal;

sending respective transmission time domain information to the first network device and the second network device, respectively, thereby enabling the first network device and the second network device to perform transmission with the user terminal according to their own transmission time domain information.

The transceiver 1802 is configured to receive and transmit data under the control of the processor 1801.

In FIG. 18, the bus architecture may include any number of interconnected buses and bridges. Specifically, various circuits of one or more processors, which are represented by the processor 1801, and the storage, which is represented by the memory 1803, are linked together. The bus architecture may link various other circuits, such as a peripheral device, voltage regulator and a power management circuit together. These features are well known in this field, therefore, this disclosure does not make further description on these features. The bus interface provides an interface. The transceiver 1802 can be multiple elements, including a transmitter and a receiver and provide units, which communicate with other devices on the transmission medium. For different user equipment, the user interface 1804 may also be an interface capable of externally connecting required devices, including but not limited to a keypad, a monitor, a speaker, a microphone, a joystick, and the like.

The processor 1801 is responsible for managing the bus architecture and common processing and the memory 1803 may store data used by the processor 1801 when executing the operations.

Optionally, the transmission time domain information of the first network device includes location information of available time domain resources for transmission between the first network device and the user terminal;

the transmission time domain information of the second network device includes location information of available time domain resources for transmission between the second network device and the user terminal.

Optionally, the location information includes bitmap information of time domain resources and an identification of the user terminal, and also includes one or more of the following: start time, end time and duration.

Optionally, the time domain resources include time domain resources corresponding to a Hybrid Automatic Repeat Request (HARQ) process, then the bitmap information includes bitmap information of the HARQ process; or, the time domain resource includes a slot, then the bitmap information includes bitmap information of the slot; or, the time domain resource includes a subframe, then the bitmap information includes bitmap information of the subframe; or, the time domain resources include a slot group, then the bitmap information includes bitmap information of the slot group; or the time domain resources include a subframe group, then the bitmap information includes bitmap information of the subframe group.

It should be noted that the centralized control unit 1800 in the embodiment may be the centralized control unit in any of the method embodiments of the present disclosure, and the centralized control unit in the method embodiments of the present disclosure can be implemented by the centralized control unit 1800 in the embodiment with the same beneficial effects achieved, and details are not described herein again.

Figure 19:
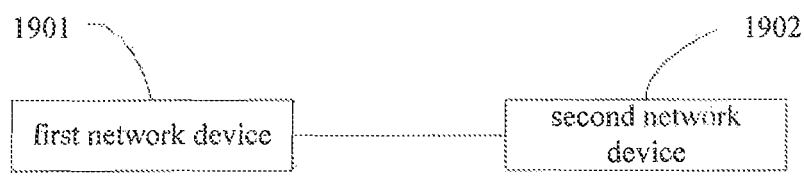
FIG. 19 is a structural diagram of a transmission system for terminal self-interference according to an embodiment of the present disclosure.

Referring to FIG. 19, FIG. 19 is a structural diagram of a transmission system for terminal self-interference according to an embodiment of the present disclosure. As shown in FIG. 19, the transmission system includes a first network device 1901 and a second network device 1902. The network device 1901 may be the first network device of any embodiment of the present disclosure, and the second network device 1902 may be the second network device of any embodiment of the present disclosure, details of which will not be elaborated herein.

Figure 20:
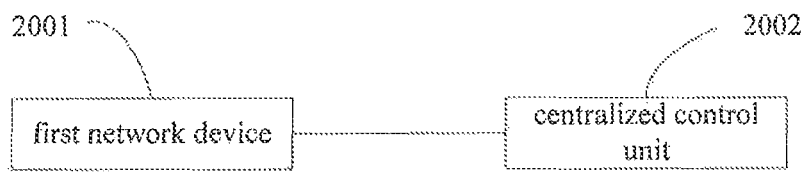
FIG. 20 is a structural diagram of a transmission system for terminal self-interference according to an embodiment of the present disclosure.

Referring to FIG. 20, FIG. 20 is a structural diagram of another transmission system for terminal self-interference according to an embodiment of the present disclosure. As shown in FIG. 20, the transmission system includes a first network device 2001 and a centralized control unit 2002. The first network device 2001 may be the first network device of any embodiment of the present disclosure. The centralized control unit 2002 may be the centralized control unit of any implementation manner provided by the embodiments of the present disclosure, and details are not described herein.

One embodiment of the present disclosure further provides a computer readable storage medium, which stores a resource configuration program. When the resource configuration program is executed by the processor, the processor implements steps of the transmission method for terminal self-interference corresponding to the first network device of the embodiment of the present disclosure.

One embodiment of the present disclosure further provides a computer readable storage medium, which stores a resource configuration program. When the resource configuration program is executed by the processor, the processor implements steps of the transmission method for terminal self-interference corresponding to the second network device of the embodiment of the present disclosure.

One embodiment of the present disclosure further provides a computer readable storage medium, which stores a resource configuration program. When the resource configuration program is executed by the processor, the processor implements steps of the transmission method for terminal self-interference corresponding to the centralized control unit of the embodiment of the present disclosure.

A person skilled in the art may be aware that, in combination with the examples described in the embodiments of this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for convenient and brief description, for a detailed working procedure of the foregoing system, apparatus, and unit, reference may be made to a corresponding procedure in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of this disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a Universal Serial Bus (USB) flash drive, a removable hard disk, a ROM, a RAM, a magnetic disk, or an optical disc.

The aforementioned are merely specific implementations of this disclosure, but the scope of the disclosure is by no means limited thereto. Any modifications or replacements that would easily occurred to those skilled in the art, without departing from the technical scope disclosed in the disclosure, should be encompassed in the scope of this disclosure. Therefore, the scope of this disclosure is to be determined by the scope of the claims.

What is claimed is:

1. A transmission method, which is applied to a first network device, comprising:
   receiving transmission time domain information from a second network device; wherein the transmission time domain information comprises time domain resources to be occupied by transmission between the second network device and a user terminal; and
   performing transmission with the user terminal according to the transmission time domain information.

2. The method of claim 1, wherein the performing transmission with the user terminal according to the transmission time domain information, comprises:
   determining available time domain resources for transmission between the first network device and the user terminal according to the time domain resources to be occupied by transmission between the second network device and the user terminal; and
   performing transmission with the user terminal on the determined available time domain resources.

3. The method of claim 1, wherein the transmission time domain information comprises location information of the time domain resources; the location information comprises bitmap information of the time domain resources and an identification of the user terminal; the bitmap information comprises one or more of the following: start time, end time and duration.

4. The method of claim 3, wherein the time domain resources comprise time domain resources corresponding to a Hybrid Automatic Repeat Request (HARQ) process, and the bitmap information comprises bitmap information of the HARQ process; or,
   the time domain resources comprise slot, and the bitmap information comprises bitmap information of slot; or,
   the time domain resources comprise subframe, and the bitmap information comprises bitmap information of subframe; or,
   the time domain resources comprise a slot group, and the bitmap information comprises bitmap information of the slot group; or,
   the time domain resources comprise a subframe group, and the bitmap information comprises bitmap information of the subframe group.

5. The method of claim 1, wherein before the receiving transmission time domain information from the second network device, the method further comprises:
   determining whether the user terminal experiences terminal self-interference; wherein the terminal self-interference is interference of an uplink signal sent by the user terminal in a first system to a downlink signal received by the user terminal in a second system;
   when the user terminal experiences terminal self-interference, determining a predicted frequency range affected by the terminal self-interference for the terminal.

6. The method of claim 5, wherein the determining whether the user terminal experiences terminal self-interference, comprises;
   determining whether a terminal self-interference isolation reported by the user terminal is smaller than a preset first threshold; when the terminal self-interference isolation is smaller than the preset first threshold, determining that the user terminal experiences terminal self-interference; or,
   determining whether a downlink packet loss rate reported by the user terminal is greater than a preset second threshold; when the downlink packet loss rate is greater than the preset second threshold, determining that the user terminal experiences terminal self-interference; or,
   determining whether a downlink interference level reported by the user terminal is greater than a preset third threshold; when the downlink interference level is greater than the preset third threshold, determining that the user terminal experiences terminal self-interference; or,
   determining whether a received-signal sensitivity reported by the user terminal is greater than a preset fourth threshold; when the received-signal sensitivity is greater than the preset fourth threshold, determining that the user terminal experiences terminal self-interference; or,
   determining whether a degradation value of the received-signal sensitivity reported by the user terminal is greater than a preset fifth threshold; when the degradation value of the received-signal sensitivity is greater than the preset fifth threshold, determining that the user terminal experiences terminal self-interference.

7. The method of claim 5, wherein the determining a predicted frequency range affected by the terminal self-interference for the terminal, comprises:
   calculating a first predicted candidate frequency range affected by the terminal self-interference for the user terminal in an uplink operating frequency range of the first system, and taking a first target frequency range in the first predicted candidate frequency range as the predicted frequency range; wherein the first target frequency range is in the first predicted candidate frequency range and is in a frequency range of the user terminal in a downlink system bandwidth of the second system; or,
   calculating a second predicted candidate frequency range affected by the terminal self-interference for the user terminal in an uplink operating frequency range of the first system and an uplink operating frequency range of the second system, and taking a second target frequency range in the second predicted candidate frequency range as the predicted frequency range; wherein the second target frequency range is in the second predicted candidate frequency range and is in a frequency range of the user terminal in a downlink system bandwidth of the first system.

8. A transmission method, performed by a second network device, comprising:
   sending transmission time domain information to a first network device, thereby enabling the first network device to perform transmission with the user terminal according to the transmission time domain information; wherein the transmission time domain information comprises time domain resources to be occupied by transmission between the second network device and a user terminal.

9. The method of claim 8, wherein the transmission time domain information comprises location information of the time domain resources; the location information comprises bitmap information of the time domain resources and an identification of the user terminal; the bitmap information comprises one or more of the following: start time, end time and duration.

10. The method of claim 9, wherein the time domain resources comprise time domain resources corresponding to a Hybrid Automatic Repeat Request (HARQ) process, and the bitmap information comprises bitmap information of the HARQ process; or,
   the time domain resources comprise slot, and the bitmap information comprises bitmap information of slot; or,
   the time domain resources comprise subframe, and the bitmap information comprises bitmap information of subframe; or,
   the time domain resources comprise a slot group, and the bitmap information comprises bitmap information of the slot group; or,
   the time domain resources comprise a subframe group, and the bitmap information comprises bitmap information of the subframe group.

11. The method of claim 8, wherein the method further comprises;
   determining whether the user terminal experiences terminal self-interference; wherein the terminal self-interference is interference of an uplink signal sent by the user terminal in a first system to a downlink signal received by the user terminal in a second system;
   when the user terminal experiences terminal self-interference, determining a predicted frequency range affected by the terminal self-interference for the terminal.

12. A network device comprising: a processor, a memory, a transceiver and a user interface; wherein the processor, the memory, the transceiver and the user interface are coupled together by a bus system;
   wherein when the network device is a first network device, the processor is configured to read a program in the memory to implement steps of: receiving transmission time domain information from a second network device; wherein the transmission time domain information comprises time domain resources to be occupied by transmission between the second network device and a user terminal; and performing transmission with the user terminal according to the transmission time domain information;
   wherein when the network device is a second network device, the processor is configured to read a program in the memory to implement steps of: sending transmission time domain information to a first network device, thereby enabling the first network device to perform transmission with the user terminal according to the transmission time domain information; wherein the transmission time domain information comprises time domain resources to be occupied by transmission between the second network device and a user terminal.

13. The network device of claim 12, wherein when the network device is the first network device and when performing transmission with the user terminal according to the transmission time domain information, the processor is configured to read the program in the memory to implement steps of:
   determining available time domain resources for transmission between the first network device and the user terminal according to the time domain resources to be occupied by transmission between the second network device and the user terminal; and
   performing transmission with the user terminal on the determined available time domain resources.

14. The network device of claim 12, wherein the transmission time domain information comprises location information of the time domain resources.

15. The network device of claim 14, wherein the location information comprises bitmap information of the time domain resources and an identification of the user terminal; the bitmap information comprises one or more of the following: start time, end time and duration.

16. The network device of claim 15, wherein the time domain resources comprise time domain resources corresponding to a Hybrid Automatic Repeat Request (HARQ) process, and the bitmap information comprises bitmap information of the HARQ process; or,
   the time domain resources comprise slot, and the bitmap information comprises bitmap information of slot; or,
   the time domain resources comprise subframe, and the bitmap information comprises bitmap information of subframe; or,
   the time domain resources comprise a slot group, and the bitmap information comprises bitmap information of the slot group; or,
   the time domain resources comprise a subframe group, and the bitmap information comprises bitmap information of the subframe group.

17. The network device of claim 12, wherein when the network device is the first network device, before the receiving transmission time domain information from the second network device, the processor is configured to read the program in the memory to implement steps of;

determining whether the user terminal experiences terminal self-interference; wherein the terminal self-interference is interference of an uplink signal sent by the user terminal in a first system to a downlink signal received by the user terminal in a second system;

when the user terminal experiences terminal self-interference, determining a predicted frequency range affected by the terminal self-interference for the terminal.

18. The network device of claim 17, wherein when the network device is the first network device and when determining whether the user terminal experiences terminal self-interference, the processor is configured to read the program in the memory to implement steps of:

determining whether a terminal self-interference isolation reported by the user terminal is smaller than a preset first threshold; when the terminal self-interference isolation is smaller than the preset first threshold, determining that the user terminal experiences terminal self-interference; or, determining whether a downlink packet loss rate reported by the user terminal is greater than a preset second threshold; when the downlink packet loss rate is greater than the preset second threshold, determining that the user terminal experiences terminal self-interference; or, determining whether a downlink interference level reported by the user terminal is greater than a preset third threshold; when the downlink interference level is greater than the preset third threshold, determining that the user terminal experiences terminal self-interference; or, determining whether a received-signal sensitivity reported by the user terminal is greater than a preset fourth threshold; when the received-signal sensitivity is greater than the preset fourth threshold, determining that the user terminal experiences terminal self-interference; or, determining whether a degradation value of the received-signal sensitivity reported by the user terminal is greater than a preset fifth threshold; when the degradation value of the received-signal sensitivity is greater than the preset fifth threshold, determining that the user terminal experiences terminal self-interference.

19. The network device of claim 17, wherein when the network device is the first network device and when determining a predicted frequency range affected by the terminal self-interference for the terminal, the processor is configured to read the program in the memory to implement steps of:

calculating a first predicted candidate frequency range affected by the terminal self-interference for the user terminal in an uplink operating frequency range of the first system, and taking a first target frequency range in the first predicted candidate frequency range as the predicted frequency range; wherein the first target frequency range is in the first predicted candidate frequency range and is in a frequency range of the user terminal in a downlink system bandwidth of the second system; or, calculating a second predicted candidate frequency range affected by the terminal self-interference for the user terminal in an uplink operating frequency range of the first system and an uplink operating frequency range of the second system, and taking a second target frequency range in the second predicted candidate frequency range as the predicted frequency range; wherein the second target frequency range is in the second predicted candidate frequency range and is in a frequency range of the user terminal in a downlink system bandwidth of the first system.

20. The network device of claim 12, wherein when the network device is the second network device, the processor is configured to read the program in the memory to implement steps of:

determining whether the user terminal experiences terminal self-interference; wherein the terminal self-interference is interference of an uplink signal sent by the user terminal in a first system to a downlink signal received by the user terminal in a second system;

when the user terminal experiences terminal self-interference, determining a predicted frequency range affected by the terminal self-interference for the terminal.

\* \* \* \* \*